United States Patent
Christy et al.

(10) Patent No.: US 11,286,173 B2
(45) Date of Patent: Mar. 29, 2022

(54) METHOD AND APPARATUS FOR FILTRATION OF LIME-TREATED WATER

(71) Applicant: RDP Technologies, Inc., Conshohocken, PA (US)

(72) Inventors: Richard W. Christy, Eagleville, PA (US); Michael Quici, Ambler, PA (US)

(73) Assignee: RDP Technologies, Inc., Conshohocken, PA (US)

(*) Notice: Subject to any disclaimer, the term of this patent is extended or adjusted under 35 U.S.C. 154(b) by 882 days.

(21) Appl. No.: 15/601,111

(22) Filed: May 22, 2017

(65) Prior Publication Data
US 2017/0253495 A1  Sep. 7, 2017

Related U.S. Application Data

(62) Division of application No. 13/165,921, filed on Jun. 22, 2011, now Pat. No. 9,688,547.

(51) Int. Cl.
| | |
|---|---|
| C02F 1/00 | (2006.01) |
| B01D 21/24 | (2006.01) |
| B01D 21/30 | (2006.01) |
| C02F 1/66 | (2006.01) |
| C02F 103/00 | (2006.01) |
| C02F 103/06 | (2006.01) |
| C02F 103/10 | (2006.01) |
| C02F 103/18 | (2006.01) |

(52) U.S. Cl.
CPC .......... C02F 1/004 (2013.01); B01D 21/2405 (2013.01); B01D 21/2444 (2013.01); B01D 21/2461 (2013.01); B01D 21/2488 (2013.01); B01D 21/30 (2013.01); C02F 1/66 (2013.01); *C02F 2103/007* (2013.01); *C02F 2103/06* (2013.01); *C02F 2103/10* (2013.01); *C02F 2103/18* (2013.01)

(58) Field of Classification Search
None
See application file for complete search history.

(56) References Cited

U.S. PATENT DOCUMENTS

| | | |
|---|---|---|
| 4,126,546 A | 11/1978 | Hjelmner et al. |
| 4,197,201 A | 4/1980 | Hjelmner et al. |
| 4,482,528 A | 11/1984 | Emmett |
| 4,891,142 A | 1/1990 | Hering, Jr. |
| 5,186,840 A | 2/1993 | Christy et al. |
| 5,368,731 A | 11/1994 | Pesotini |

(Continued)

FOREIGN PATENT DOCUMENTS

WO    2006113176    10/2006

OTHER PUBLICATIONS

"Slake," Collins English Dictionary, London: Collins, 2000, Credo Reference, Web, Dec. 31, 2013.

*Primary Examiner* — Kara M Peo
(74) *Attorney, Agent, or Firm* — Paul & Paul

(57) ABSTRACT

A method and apparatus is provided for water filtration of a milk of lime solution that contains water, impurities, and grit particles, in which the milk of lime solution enters a vessel, and wherein turbulence is created in the vessel, by which larger grit particles settle out of the milk of lime solution, to form a bed of grit particles in the lower end of the vessel, such that grit particles and impurities are filtered from the lime-treated water that comprises a milk of lime solution, with water then being drawn off, that may be discharged out one or more dosing locations and/or recycled back for further filtration, as may be desired.

14 Claims, 3 Drawing Sheets

(56) References Cited

U.S. PATENT DOCUMENTS

| | | |
|---|---|---|
| 5,549,820 A | 8/1996 | Bober et al. |
| 5,730,886 A | 3/1998 | Wachinski et al. |
| 5,746,983 A | 5/1998 | Stephansen |
| 5,843,308 A | 12/1998 | Suozzo et al. |
| 6,426,005 B1 | 7/2002 | Larson |
| 7,416,673 B2 | 8/2008 | Christy et al. |
| 2005/0127009 A1 | 6/2005 | Yawn |
| 2006/0231507 A1 | 10/2006 | Christy et al. |
| 2008/0185324 A1 | 8/2008 | Christy et al. |

METHOD AND APPARATUS FOR FILTRATION OF LIME-TREATED WATER

CROSS-REFERENCE TO RELATED APPLICATION

This application is a division of pending U.S. patent application Ser. No. 13/165,921, filed Jun. 22, 2011, which is incorporated by reference in its entirety.

BACKGROUND OF THE INVENTION

Water of various types requires treatment for removal of impurities from the water. Such treatments often involve filtration, sometimes via a sand filtration system.

The water that requires treatment can be water from a stream, from an underground aquifer, from a mining operation, from a flue gas scrubbing operation or the like. The water could alternatively be brackish or salty water from ocean incursion into rivers and streams; the water can be muddy river water or waste water from residential or industrial use.

Sometimes the water has chemicals, including organic and/or inorganic compounds and pathogens in it.

In many instances, the water is treated with lime to raise its pH to a sufficiently high level to neutralize pathogens by lime stabilization. The lime stabilization can occur by the use of calcium oxide or calcium carbonate, such as lime, quick lime, lime kiln dust, cement kiln dust, dolomite lime, or various other forms of lime suited to raise the pH of the water that is being treated, generally because of the relatively high alkalinity of lime.

Following the treatment of water with lime in some form, the thus treated liquid is generally referred to as "milk of lime". The milk of lime is generally largely in the form of a solution, but frequently has substantial undissolved particles of lime, called "grit", as well as other impurities, which can include dirt, salt, unreacted lime particles, charred or hard-burnt lime, among some of the impurities that can exist within lime-treated water.

THE PRESENT INVENTION

The present invention is directed to a method and apparatus for treating a milk of lime solution, hereinafter referred to as "MOLS", that contains water, as well as other impurities, including lime grit particles that generally are not in solution, by filtering the milk of lime solution.

The filtration that occurs in accordance with this invention uses grit particles from the milk of lime as a filtration medium to filter out other grit particles and other impurities from the milk of lime, by delivering a milk of lime to a vessel and settling grit particles from the milk of lime in an enclosure of the vessel that has a grit bed of these particles, and then creating turbulence in the enclosure of the vessel to cause milk of lime to pass upwardly through the grit bed, such that grit particles and impurities are separated from the water of the milk of lime, such that the water can be drawn off after it has been filtered through the grit bed.

Accordingly, the present invention is directed to filtering a milk of lime solution having impurities and grit particles therein, wherein grit particles in the milk of lime solution are used as the filter medium for affecting the chemistry of the water of the MOLS by filtering out other grit particles and impurities.

Accordingly, it is an object of this invention to provide a water filtration system that uses grit particles present in the MOLS as a filtration bed for filtering out other grit particles and impurities from the MOLS, in order to treat and purify the water.

It is yet another object of this invention to accomplish the above object, wherein the filter water can be recycled to go through the grit bed a number of times, if desired, to remove substantially all of the grit particles and impurities from the water.

It is a further object of this invention to accomplish the above objects in a treatment vessel that is generally funnel-shaped, having a generally vertically disposed cylindrical-shaped enclosure, and wherein turbulence is created within the enclosure as water moves upwardly through the grit bed present in the enclosure.

It is a further object of this invention to accomplish the above objects wherein grit particles are discharged from the lower end of the enclosure to either a directly connected gravity operative grit classifier, or to a remotely located gravity operative grit classifier, in either case for removal of grit.

It is another object of this invention to accomplish the above objects, wherein the treatment vessel is provided with a basin for receiving filtered water from the upper end of the vessel.

It is another object of this invention to accomplish the above objects, wherein filtered, pure water is delivered to one or more dosing stations for use.

Another object of this invention is to accomplish the objects above, wherein the system is provided with a residence tank for containing filtered, purified water after the filtration of MOLS.

Other objects and advantages of the present invention will become readily apparent upon a reading of the following brief descriptions of the drawing figures, the detailed descriptions of the preferred embodiments, and the appended claims.

SUMMARY OF THE INVENTION

A method and apparatus is provided for filtering MOLS to remove grit particles and impurities therefrom by using grit particles themselves from the MOLS to form a filtration bed, and to create turbulence for MOLS to pass through the filtration bed, in an upwardly direction, whereby the grit particles and impurities are filtered out and whereby filtered water may be drawn off from an upper end of the vessel in which the filtration takes place.

BRIEF DESCRIPTIONS OF THE DRAWINGS FIGURES

FIG. 1 is a vertical, sectional, schematic view of an apparatus of this invention wherein a filtration bed is present in a generally frusto-conical vessel, illustrating the use of a grit bed to filter water for discharge from an upper end of the frusto-conical vessel, to a residence tank, and then to a dosing station, with grit being discharged from the bottom of the frusto-conical vessel to a gravity-operative grit classifier.

DETAILED DESCRIPTIONS OF THE PREFERRED EMBODIMENTS

Figure 1:
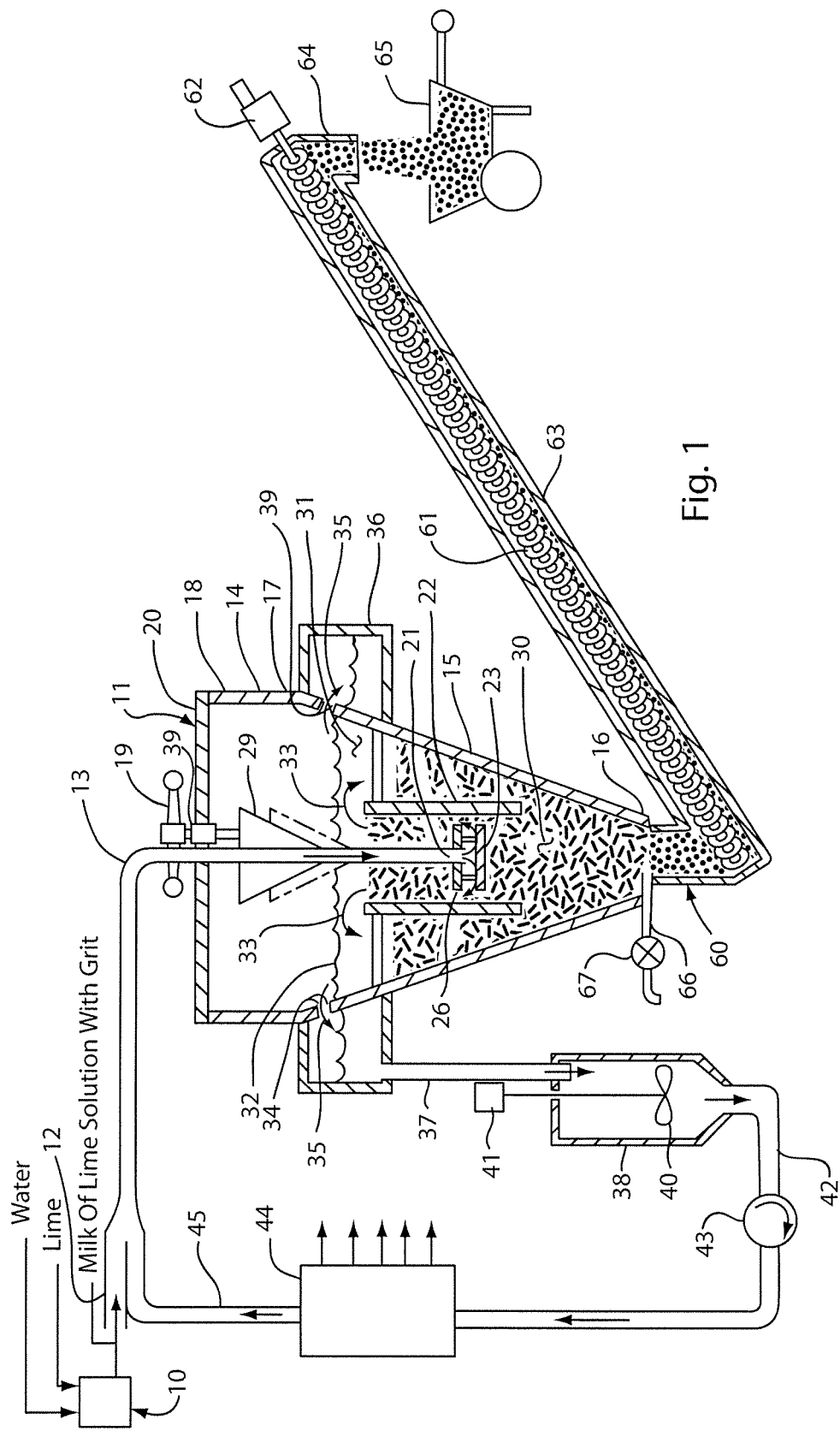

Referring now to the drawings in detail, reference is first made to FIG. 1. The water that is to be treated is treated with lime off-site and is delivered to the apparatus of this invention generally designated by the numeral 11. This lime-treated water contains grit and other impurities and is referred to as a milk of lime solution (MOLS). The MOLS is delivered to an inlet 12 of a conduit 13, and enters a vessel 14. The vessel 14 has a frusto-conical or funnel-shaped configuration 15, the lower end 16 of which has a small diameter compared with the larger diameter 17 at its upper end. The upper-most end 18 of the vessel 14 has a generally circular top 20.

The conduit 13 has a vertical portion that terminates at 21, inside a generally cylindrical enclosure 22 disposed suspended by appropriate radial brackets inside the funnel-shaped portion 15 of the vessel 14, as a suspended bed scrubber.

Figure 3:
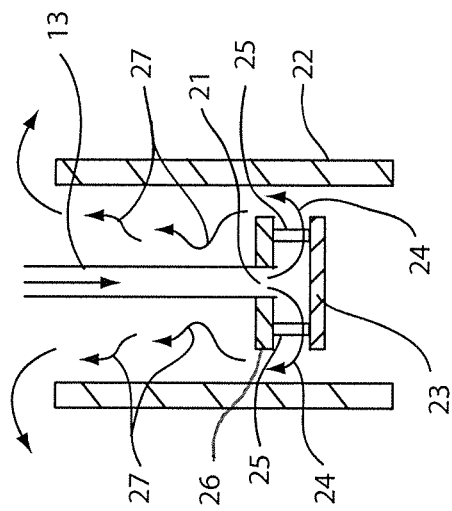
FIG. 3 is an enlarged, fragmentary view of the generally cylindrical enclosure within the vessel of FIG. 1, and wherein the MOLS inlet line is shown delivering the MOLS to impinge on a baffle plate therebeneath, for effecting an upward change in direction of the liquid.

With reference now to FIG. 3, for greater clarity, the lower end 21 of the conduit directs the MOLS to impinge against a baffle plate 23, as shown by the arrows 24. The lower baffle plate 23 is carried spaced below the lower end 21 of the conduit 13 by spacer members 25 carried from upper baffle plate 26. The impingement of incoming MOLS against baffle plates 23, 26 creates a turbulence as demonstrated by the arrows 27, causing grit particles in the MOLS to settle out, as shown in about the lower three quarters of the funnel-shaped portion 15 of the vessel 14 in FIG. 1.

This settling-out of grit forms a grit bed 30 in the funnel-shaped portion 15 of the vessel 14.

Continued entry of MOLS via conduit 13 enables the grit bed to occupy a substantial portion of the funnel-shaped portion 15 of the vessel 14, especially inside the generally cylindrical enclosure 22, as shown. With continued inflow of MOLS into the cylindrical shaped enclosure 22, and against the lower and upper baffles 23, 26 causes the grit, which initially is larger grit particles, to filter out other, often smaller grit particles, and other impurities, such that water at the upper end 31 of the funnel-shaped portion 15 of the enclosure 14 is substantially free of grit particles and impurities and passes over the upper end of the cylindrical enclosure 22 as shown by the arrows 33, such that a water level 32 is maintained, with overflow passing outwardly through exit ports 34 as shown by the arrows 35 into a cylindrical or ring-like catch basin 36 disposed outside of, and around the upper end of the funnel-shaped portion 15 of the vessel 14, as shown.

Accumulated water in the catch basin 36 passes out discharge conduit 37 via gravity, preferably, into residence tank 38. It will be understood that, depending upon the placement of components of the system, if desired, a pump could be used in discharge line 37, if gravity flow is not used.

The residence tank 38 may be provided with a mixer 40, motor driven at 41, as shown, and may hold water discharged from the catch basin 36.

The discharge from the residence tank 38 may be out discharge line 42, being pumped by a pump 43 to a dosing station 44, from which purified, filtered water may be drawn off, if desired, as will be described hereinafter, or alternatively may not be drawn off, but may be delivered via conduit 45, back into inlet conduit 13, to be recycled one or more times, as may be desired.

In the event that the liquid level 32 in the vessel 11 drops below the outlet ports 34, and if it is desired to raise the level of liquid within the vessel 14 to permit water to flow into the catch basin 36, the conical plug 29 may be lowered manually by turning the operating handle 19, which is in threaded engagement at 39 with the top 20 of the vessel 14, to lower the plug 29 from its full line position illustrated in FIG. 1, to its phantom position, to change the surface area of water at the upper end of the funnel-shaped portion 15 of the vessel 14 to raise the level. Similarly, in appropriate circumstances it may be desirable to raise the plug 29, to lower the level 32 of water.

Figure 2:
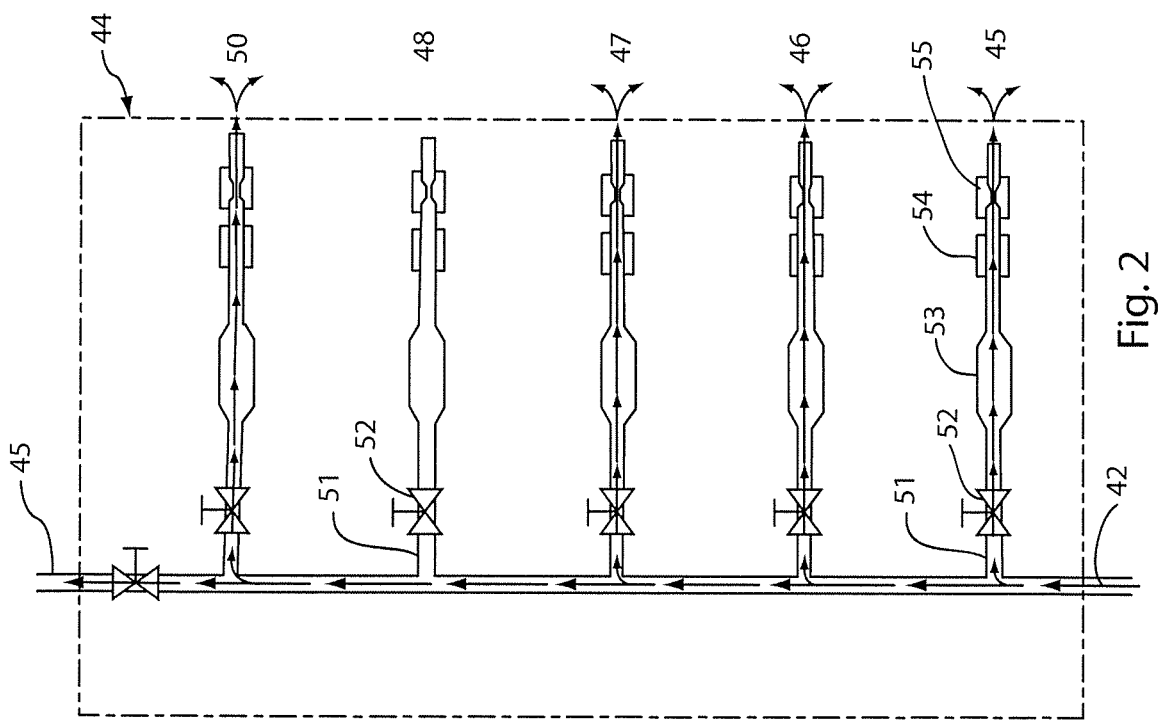
FIG. 2 is an enlarged schematic fragmentary view of the dosing station illustrated in FIG. 1, wherein the dosing station has a plurality of dosing discharge locations therein.

With reference to FIG. 2, the dosing station 44 will now be described in greater detail.

At dosing station 44, there are illustrated 5 dosing locations 45, 46, 47, 48 and 50, although it will be understood that a greater or fewer number of such locations may be provided, as may be desired.

Each of the dosing locations has a conduit line 51, a valve 52, an optional grit trap 53, a magnetic flowmeter 54 and a metering pump 55, such that when one desires to discharge water at a dosing location, such as that 45, the valve 52 would be opened, allowing water flow through the grit trap 53, through the magnetic flowmeter 54, to be pumped out location 45, for example, by metering pump 55.

In the illustration of FIG. 2, it will be understood that the valves 52 are open at locations 45, 46, 47 and 50, but that the valve 52 at dosing location 48 is closed, such that there is no flow of water via line 51 for dosing location 48. It will be understood that, if desired, all of the dosing locations illustrated in FIG. 2 may be in an open condition, if desired, only some of the valves could be open, or all of the valves 52 could be closed, if desired, in which case, water flow through conduit 42 may completely bypass the dosing locations 45, 47, 47, 48 and 50, to be recycled as described above, via conduit 45.

It will be seen that grit and impurities may pass out the lower end 16 of the funnel-shaped portion 15 of the vessel 14, and enter into a grit classifier. In the embodiment of FIG. 1, the grit classifier 60 is shown directly beneath the funnel-shaped portion 15, to receive grit therein as it passes out the lower end 16 of the vessel 14, entering directly into the gravity-operative grit classifier 60. The classifier 60 comprises a rotating auger 61, motor driven at 62, for lifting grit particles upwardly through the sloped tubular or cylindrical portion 63 of the classifier 60 to a discharge location 64 at the upper end of the classifier 60, which upper end is above the level 32 of water 34 in the vessel 14, so that grit alone is discharged at location 64, into any desirable container 65 for collecting the same. In the embodiment shown in FIG. 1, the container 65 is in the form of a wheelbarrel, but it will be understood that any accumulation device may be used in place of the wheelbarrel 65.

For cleanout purposes a normally closed liquid discharge line 66 may be provided at the lower end 16 of the vessel 14, valve-operated at 67, as shown.

It will thus be understood that during the course of operating, grit may build up in the funnel-shaped vessel, as described above, and that the gravity-operative grit classifier 60 may be either continually, or periodically operated, as need be, to maintain the grit accumulation within the vessel 14 at a desired level for continued filtration of grit particles and impurities from the MOLS. If desired, a grit level sensor (not shown) may be provided in the vessel 14, which can periodically operate the drive motor 62 for the gravity-operative grit classifier 60, when grit accumulation in the vessel 14 reaches a predetermined level. Alternatively, the grit classifier can be continuously operated, as may be desired.

Figure 4:
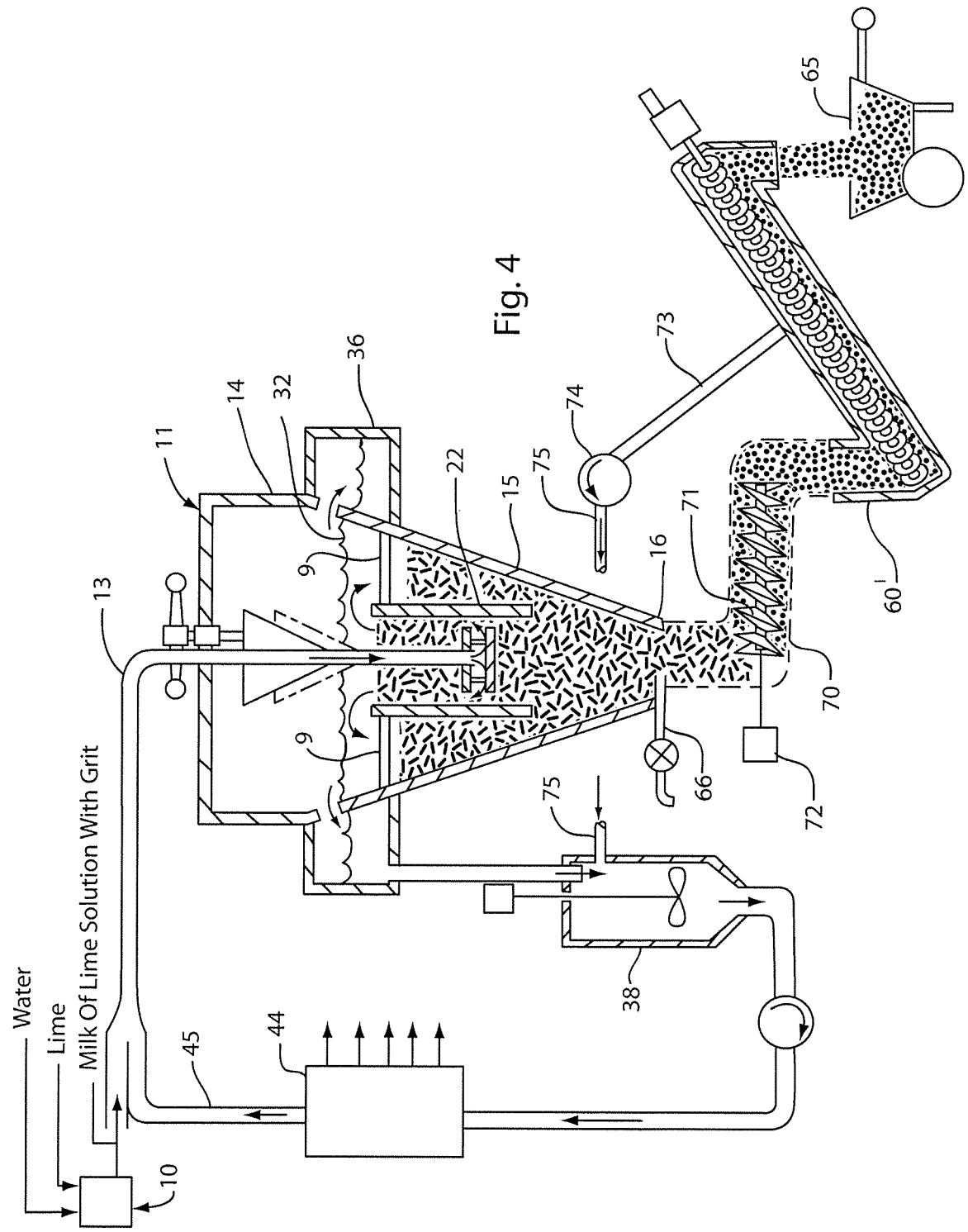
FIG. 4 is an illustration similar to that of FIG. 3, but wherein the gravity-operative grit classifier is remotely located relative to the frusto-conical vessel.

Referring now to FIG. 4, an alternative placement for the gravity-operative grit classifier 60' is shown, in which the grit classifier 60' is located at a remote location from that of the vessel 11, by which any suitable conveyor mechanism 71, motor driven at 72, may convey grit through a grit conveying line 70 to a remotely located gravity-operative grit classifier 60', as shown in phantom for the conveyor line 70 in FIG. 4. In the event that the grit classifier 60' is not located such that its upper end is above the liquid level 32 in the vessel 11, a liquid discharge line 73 may convey water that may be present in the classifier 60' outwardly, via an optional pump 74, and into residence tank 38, via liquid conduit line 75, as shown.

It will be apparent from the foregoing that various modifications may be made in the detailed description of the equipment of this invention, all within the spirit and scope of the invention as defined in the appended claims.

What is claimed is:

1. A water filtration apparatus for treating a milk of lime solution (MOLS) that contains water, impurities and grit particles, comprising:
   (a) means for delivering the MOLS to a treatment vessel having an upper end and lower end in the form of a generally funnel-shaped structure with a generally vertically disposed cylindrical-shaped enclosure;
   (b) means for creating a turbulence in the vessel to cause larger grit particles in the MOLS to settle out of the MOLS and form a bed of larger grit particles in the lower end of the vessel;
   (c) means for continuing the delivery of MOLS through the vessel and through the bed of larger grit particles of clause (b) to filter out smaller grit particles and impurities from the MOLS at the lower end of the vessel while creating turbulence in the vessel so that water from the MOLS that has smaller grit particles and impurities filtered therefrom rises to the upper end of the vessel;
   (d) means for drawing off the filtered water from the upper end of the vessel.

2. The apparatus of claim 1, including means for recycling the filtered water via the means of clauses (a) through (c) of claim 1 until water is filtered to remove the smaller grit particles and impurities from the water of the MOLS.

3. The apparatus of claim 1, wherein the cylindrical-shaped enclosure has an upper end and a lower end and is open at the upper and lower ends and including a MOLS-supplying conduit terminating between a pair of baffle plates for creating turbulence in the MOLS discharged from the MOLS-supplying conduit for accumulating larger grit particles in the generally cylindrical-shaped enclosure, and with the turbulence being in the generally cylindrical-shaped enclosure.

4. The apparatus of claim 3, including means for discharging grit particles from the MOLS through the lower end of the cylindrical-shaped enclosure and outwardly of the lower end of the funnel-shaped structure.

5. The apparatus of claim 3, wherein the vessel is provided with a catch basin for receiving filtered water from the upper end of the vessel.

6. The apparatus of claim 5, including at least one dosing station for discharge of filtered water and a conduit line for supplying the filtered water from any of the upper end of the vessel and the catch basin to the at least one dosing station.

7. The apparatus of claim 1, including at least one openable valve at an at least one dosing station for delivery of filtered water therefrom.

8. The apparatus of claim 2, including at least one dosing station for discharge of filtered water and means supplying filtered water from the vessel to the at least one dosing station.

9. The apparatus of claim 6, including a residence tank means for collecting filtered water from any of the upper end of the vessel and the catch basin prior to providing the filtered water to the at least one dosing station.

10. The apparatus of claim 4, wherein the means for discharging includes means for direct discharging of grit particles to a gravity operative grit classifier directly connected to the lower end of the funnel-shaped structure.

11. The apparatus of claim 4, wherein the means for discharging includes means for discharging of grit particles to a gravity operative grit classifier remotely connected to the lower end of the funnel-shaped structure.

12. The apparatus of claim 11, including a residence tank means for collecting filtered water from any of the upper end of the vessel and catch basin prior to providing the filtered water to the at least one dosing station, including means for supplying filtered water from the grit classifier to the residence tank.

13. The apparatus of claim 3, including means for maintaining a level of filtered water at the upper end of the generally funnel-shaped structure to provide a supply of filtered water to be drawn off by the means for drawing off the filtered water from the upper end of the vessel.

14. The apparatus of claim 4, further including means for recycling the filtered water via:
   (a) the means for delivering the MOLS to a treatment vessel having upper and lower ends;
   (b) the means for creating a turbulence in the vessel to cause larger grit particles in the MOLS to settle out of the MOLS and form a bed of larger grit particles in a lower end of the vessel;
   (c) the means for continuing the delivery of MOLS through the vessel and through the bed of larger grit particles of clause (b) to filter out smaller grit particles and impurities from the MOLS at the lower end of the vessel while creating turbulence in the vessel so that water from the MOLS that has smaller grit particles and impurities filtered therefrom rises to an upper end of the vessel;
   until water is filtered to remove the smaller grit particles and impurities from the water of the MOLS;
   wherein the vessel is provided with a catch basin for receiving filtered water from the upper end of the vessel, including at least one dosing station for discharge of filtered water and means for supplying the filtered water from any of the upper end of the vessel and the catch basin to the at least one dosing station, is operative, including means for opening at least one openable valve at the at least one dosing station for delivery of filtered water therefrom, including residence tank means for collecting filtered water from any of the upper end of the vessel and catch basin prior to providing the filtered water to the at least one dosing station, wherein the means for discharging includes means for discharging of grit particles to a gravity operative grit classifier connected to the lower end of the funnel-shaped structure, and including means for maintaining a level of filtered water at the upper end of the generally funnel-shaped structure to provide a supply of filtered water to be drawn off by the means for drawing off the filtered water from the upper end of the vessel.

* * * * *